No. 804,886. PATENTED NOV. 21, 1905.
D. G. SAUNDERS, Jr.
ENVELOP MOISTENER AND SEALER.
APPLICATION FILED MAR. 2, 1905.
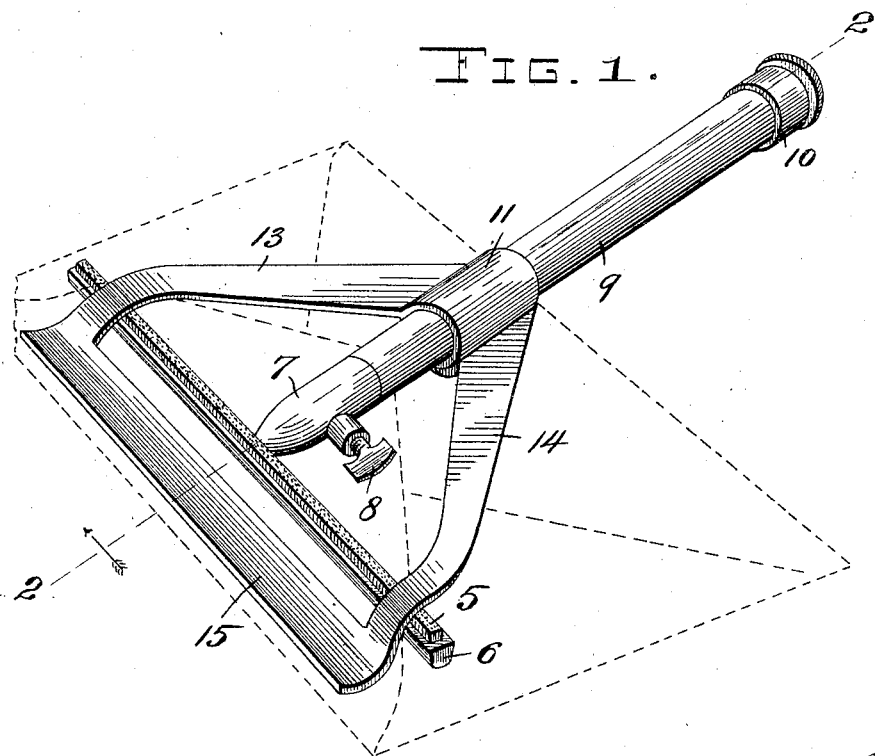
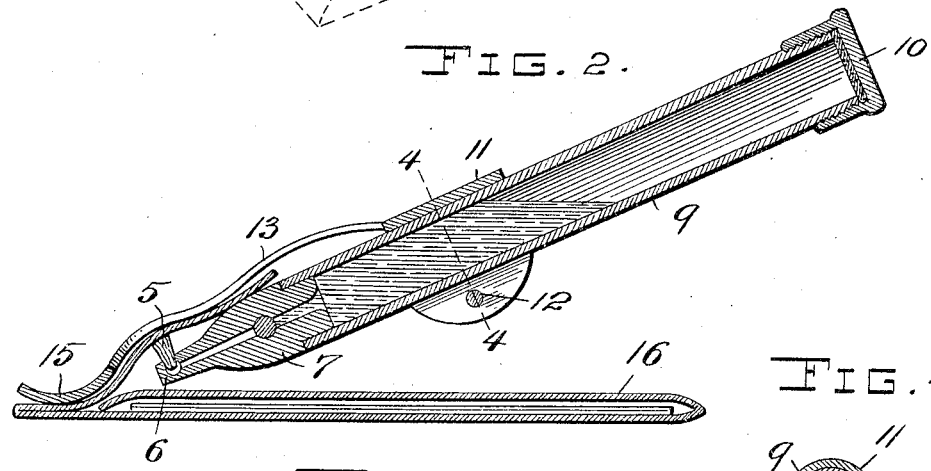
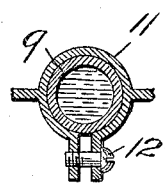
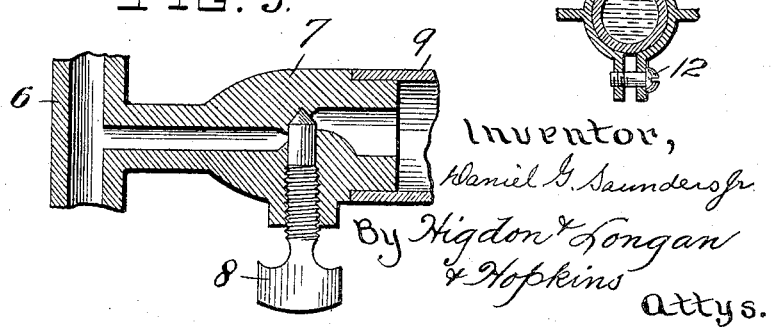

UNITED STATES PATENT OFFICE.

DANIEL GREEN SAUNDERS, JR., OF KANSAS CITY, MISSOURI.

ENVELOP MOISTENER AND SEALER.

No. 804,886.     Specification of Letters Patent.     Patented Nov. 21, 1905.

Application filed March 2, 1905. Serial No. 248,058.

*To all whom it may concern:*

Be it known that I, DANIEL GREEN SAUNDERS, Jr., a citizen of the United States, and a resident of Kansas City, Missouri, have invented certain new and useful Improvements in Envelop Moisteners and Sealers, of which the following is a specification containing a full, clear, and exact description, reference being had to the accompanying drawings, forming a part hereof.

My invention relates to improvements in envelop moisteners and sealers; and it consists of the novel features herein shown, described, and claimed.

In the drawings, Figure 1 is a perspective of an envelop-sealer embodying the principles of my invention. Fig. 2 is a vertical central section on the line 2 2 of Fig. 1. Fig. 3 is an enlarged horizontal sectional detail through the stop-valve. Fig. 4 is a cross-section on the line 4 4 of Fig. 2.

Referring to the drawings in detail, the wick 5 is mounted in the wick-trough 6. The valve-casing 7 extends from the center of the wick-trough, and the stop-valve 8 is mounted in the valve-casing. The reservoir-tube 9 is attached to the valve-casing, and the cap 10 closes the other end of the reservoir. The clamp 11 is slidingly mounted upon the reservoir 9, said clamp being tightened upon the reservoir by a screw 12, so as to hold the clamp in any desired position. Arms 13 and 14 extend outwardly and downwardly from the clamp, and the pressure-bar 15 connects the lower ends of the arms. The pressure-bar 15 is preferably curved in cross-section or runner-shaped, and the position of the pressure-bar relative to the trough is adjusted and controlled by the clamp 11.

The cap 10 is removed and the reservoir 9 filled with water, the valve 8 being closed. Then the valve 8 is opened and water allowed to run into the trough 6 and saturate the wick 5. The envelops 16 are laid face downward, and the device is operated to insert the flap of the envelop upwardly between the pressure-bar 15 and the trough of the wick 5 and above the valve-casing 7. The arms 13 and 14 are curved as they pass over the wick 5, so as to press the flap down upon the wick. After the flap has been inserted into the device the reservoir is tipped downwardly and drawn forwardly to bring the flap in contact with the wick, thereby moistening the gum, and the pressure-bar 15 presses the flap into its closed position. The wick 5 may be of any desired length.

By the use of my improved envelop moistener and sealer envelops may be rapidly closed, and at the same time the device is cheap and simple.

I claim—

1. The improved envelop moistener and sealer, comprising a wick-trough extending transversely of the device, and having a length approximately the same as that of the envelops to be sealed; a wick in the trough; a reservoir communicating with the trough; and a transverse pressure-bar extending parallel with the said wick-trough and adapted to receive the entire flap of an envelop between said pressure-bar and said wick-trough, and arranged to press the envelop-flap upon the wick, and to press the flap to its sealed position by a single movement of the device transversely of the sealed envelop.

2. In an envelop moistener and sealer; a trough; a wick in the trough; a reservoir connected to the trough; a stop-valve controlling the flow from the reservoir to the trough; a clamp adjustably mounted upon the reservoir and a pressure-bar connected to the clamp and adapted to press the envelop-flaps against the wick and then press said flaps to their sealed positions.

In testimony whereof I have signed my name to this specification in presence of two subscribing witnesses.

DANIEL GREEN SAUNDERS, JR.

Witnesses:
    EDWARD E. LONGAN,
    ALFRED A. EICKS.